US012572910B2

(12) United States Patent
Lee

(10) Patent No.: US 12,572,910 B2
(45) Date of Patent: Mar. 10, 2026

(54) INTEGRATED BANKING APPARATUS USING FINTECH

(71) Applicant: Seung Min Lee, Jeju-si (KR)

(72) Inventor: Seung Min Lee, Jeju-si (KR)

( * ) Notice: Subject to any disclaimer, the term of this patent is extended or adjusted under 35 U.S.C. 154(b) by 41 days.

(21) Appl. No.: 18/792,701

(22) Filed: Aug. 2, 2024

(65) Prior Publication Data

US 2025/0045717 A1 Feb. 6, 2025

(30) Foreign Application Priority Data

Aug. 2, 2023 (KR) ......................... 10-2023-0101199

(51) Int. Cl.
*G06Q 20/10* (2012.01)

(52) U.S. Cl.
CPC .................................. *G06Q 20/108* (2013.01)

(58) Field of Classification Search
CPC ....... G06Q 20/108; G06Q 40/02; G06Q 40/04
See application file for complete search history.

(56) References Cited

U.S. PATENT DOCUMENTS

| | | | | |
|---|---|---|---|---|
| 2014/0207678 A1* | 7/2014 | Conyers | .............. | G06Q 20/3223 |
| | | | | 705/44 |
| 2022/0051208 A1* | 2/2022 | Berrod | ............... | G06Q 20/4014 |
| 2022/0335430 A1* | 10/2022 | Hubley | ............... | G06F 16/2365 |

FOREIGN PATENT DOCUMENTS

| | | | | |
|---|---|---|---|---|
| CA | 2839752 A1 * | 7/2014 | .......... | G06Q 20/108 |
| KR | 20090098633 A * | 9/2009 | .......... | H04L 9/3228 |
| KR | 10-2018-0074650 A | 7/2018 | | |
| KR | 10-2021-0067173 A | 6/2022 | | |

OTHER PUBLICATIONS

Xu et al.: Distributed Electronic Payment System Based on Bank Union, 2000, IEEE, pp. 548-551 (Year: 2000).*
Casanova et al.: Expert System for Automated Authorization of Deficits, 1989 IEEE, pp. 732-736. (Year: 1989).*

* cited by examiner

*Primary Examiner* — Bijendra K Shrestha
(74) *Attorney, Agent, or Firm* — Bridgeway IP Law Group, PLLC; Jihun Kim

(57) ABSTRACT

Proposed are an integrated banking device using fintech. The integrated banking device includes a receiver configured to receive account information of a second entity which provides money from a first entity which requests a deposit of money and a processor configured to provide the second entity with an application programming interface (API) for generating interoperation information corresponding to an account of the second entity in conjunction with a first server, which provides a financial service on the basis of the account information, and the second entity and withdraw money from the account of the second entity on the basis of the deposit request and the interoperation information.

6 Claims, 9 Drawing Sheets

INTEGRATED BANKING APPARATUS USING FINTECH

BACKGROUND

Field of the Invention

Embodiments of the present disclosure relate to an integrated banking device using fintech.

Discussion of Related Art

The term "fintech" is a combination of "finance" and "technology," and refers to the transformation of financial services and industries based on cutting-edge information technologies such as mobile, big data, social network service (SNS), and the like. Fintech is the convergence of finance and information technology (IT) such as mobile-based payments, money transfers, asset management, and crowdfunding.

A banking service collectively refers to activities for managing money held in bank accounts. The way in which fintech services use a customer's financial information to manage the customer's money is continuously evolving.

Fintech may also be utilized to handle money of multiple parties in a business relationship.

SUMMARY OF THE INVENTION

According to an aspect of the present disclosure, there is provided an integrated banking device using fintech, the integrated banking device including a receiver configured to receive account information of a second entity which provides money from a first entity which requests a deposit of money and a processor configured to provide the second entity with an application programming interface (API) for generating interoperation information corresponding to an account of the second entity in conjunction with a first server, which provides a financial service on the basis of the account information, and the second entity and withdraw money from the account of the second entity on the basis of the deposit request and the interoperation information.

The interoperation information may include an account number of the second entity, the balance of the account of the second entity, and a deposit and withdrawal history of the account of the second entity, and the processor may provide the API for generating interoperation information to the second entity and store the interoperation information generated by performing scraping or crawling on the second entity in conjunction with the first server on the basis of the API.

The processor may provide the first entity with transfer information which is received from the first server and corresponds to the withdrawal of the money, and interoperate with a second server, which issues a transaction document related to the money on the basis of the transfer information, to provide the transaction document to the first entity and the second entity, and the transaction document may include at least one of an estimate, a tax statement, and a transaction statement related to the money.

The processor may interoperate with the first server to retrieve an account balance of the second entity, and when the account balance satisfies the deposit request, may interoperate with the first server to perform at least one of API provision and scraping or crawling and withdraw money from the account of the second entity, deposit the money withdrawn from the account of the second entity to a brokerage account, and withdraw the money deposited in the brokerage account to an account of the first entity.

The processor may interoperate with the first server to retrieve an account balance of the second entity, when there is uncollected money due to the account balance not satisfying the deposit request, search for at least one additional registered account of the second entity, when there is at least one additional registered account, interoperate with the first server to perform at least one of API provision and scraping or crawling and withdraw the uncollected money from the additional registered account of the second entity, and when there is not the at least one additional registered account, providing transfer stop information to the first entity.

The processor may set a first balance retrieval interval for retrieving a balance of the at least one additional registered account when there is uncollected money because the money withdrawn from the at least one additional registered account does not satisfy the deposit request, set a second balance retrieval interval which is shorter than the first balance retrieval interval when a balance corresponding to the uncollected money is not retrieved in the first balance retrieval interval, and provide the first entity with an option to perform compulsory execution on the second entity when the second balance retrieval interval is shorter than a threshold interval or exceeds a preset withdrawal deadline.

The processor may interoperate with the first server to retrieve an account balance of the second entity and, when there is uncollected money due to the account balance not satisfying the deposit request, search for bonds of the second entity, retrieve an account balance of a third entity which is an obligor of bonds of the second entity, interoperate with the first server on the basis of the deposit request to perform at least one of API provision and scraping or crawling and withdraw the uncollected money from an account of the third entity, deposit the uncollected money to the account of the first entity through the account of the second entity or deposit the uncollected money from the account of the third entity to a brokerage account, and withdraw the uncollected money deposited in the brokerage account to the account of the first entity.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
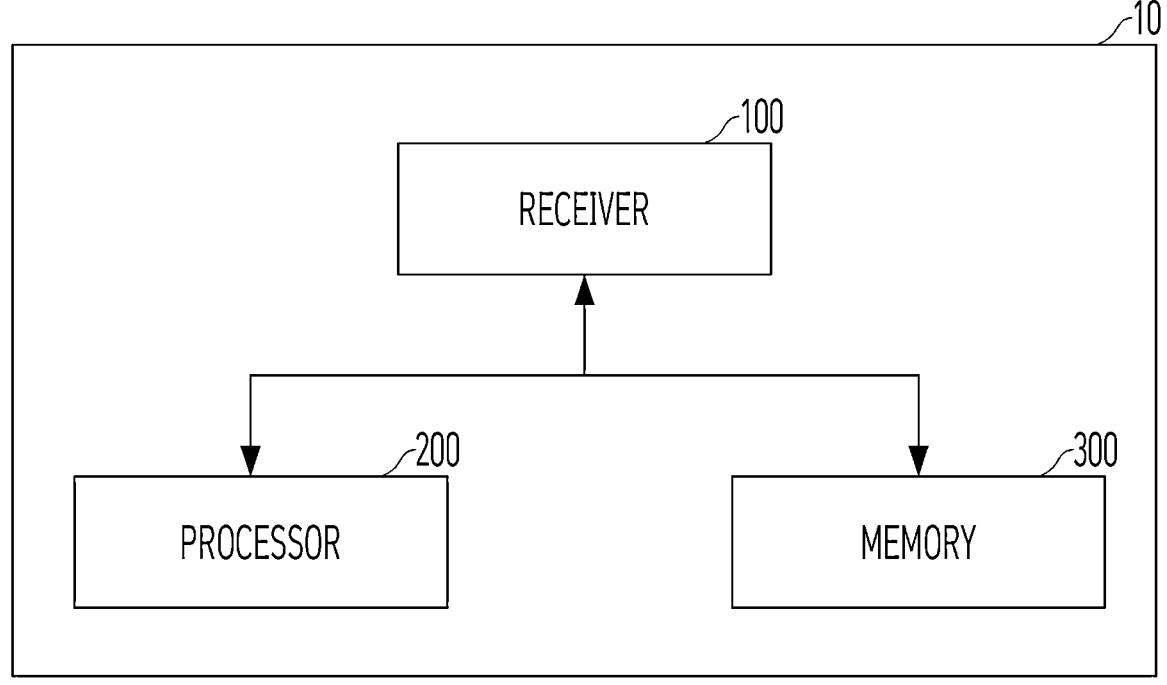
FIG. 1 is a block diagram of an integrated banking device according to an exemplary embodiment.

Specific structural and functional descriptions of embodiments are disclosed for illustrative purposes only and may be implemented in various modified forms. Accordingly, actual implementations are not limited to the specific embodiments disclosed, and the scope of this specification includes modifications, equivalents, or substitutions incorporated into the technical spirit described in the embodiments.

Terms such as "first," "second," and the like may be used to describe various components, but these terms are construed only for the purpose of distinguishing one component from others. For example, a first component may be named a second component, and similarly, a second component may be named a first component.

When a component is referred to as being "connected to" another component, the two components may be directly coupled or connected to each other, or still another component may be interposed therebetween.

Singular expressions include plural expressions unless the context clearly indicates otherwise. In this document, each of the phrases "A or B," "at least one of A and B," "at least one of A or B," "A, B, or C," "at least one of A, B, and C," and "at least one of A, B, or C" may include any one of the items listed in the phrase or all possible combinations thereof. In this specification, the terms "include," "have," and the like indicate the presence of described features, integers, steps, operations, components, parts, or combinations thereof and do not preclude the presence or addition of one or more other features, integers, steps, operations, components, parts, or combinations thereof.

Unless defined otherwise, all terms including technical or scientific terms used herein have the same meaning as commonly understood by those skilled in the art. Terms like those defined in a commonly used dictionary should be interpreted in a meaning consistent with the meaning in the context of the related technology, and are not interpreted in an ideal or excessively formal sense unless clearly defined herein.

As used herein, the term "module" may include a unit implemented using hardware, software, or firmware, and may be interchangeably used with a term such as logic, a logical block, a part, or a circuit. A module may be a single integral part or a minimum unit or part thereof performing one or more functions. For example, according to an exemplary embodiment, a module may be implemented in the form of an application-specific integrated circuit (ASIC).

As used herein, the term "unit" is a software component or a hardware component such as a field-programmable gate array (FPGA) or an ASIC, and a unit performs certain functions. However, a unit is not limited to software or hardware. A unit may be configured to be in an addressable storage medium or configured to operate one or more processors. For example, a unit may include components, such as software components, object-oriented software components, class components, and task components, processes, functions, attributes, procedures, subroutines, segments of program code, drivers, firmware, microcode, circuits, data, databases, data structures, tables, arrays, and variables. Functions provided in components and units may be combined into a smaller number of components and units or subdivided into additional components and units. Further, components and units may be implemented to operate one or more central processing units (CPUs) in a device or a security multimedia card. In addition, a unit may include one or more processors.

Hereinafter, exemplary embodiments will be described in detail with reference to the accompanying drawings. In describing the exemplary embodiments with reference to the accompanying drawings, like reference numerals refer to like components, and repetitive description thereof will be omitted.

Hereinafter, exemplary embodiments will be described in detail with reference to the accompanying drawings. In describing embodiments with reference to the accompanying drawings, like components are indicated by like reference numerals regardless of drawing number, and detailed description thereof will not be reiterated.

Figure 2:
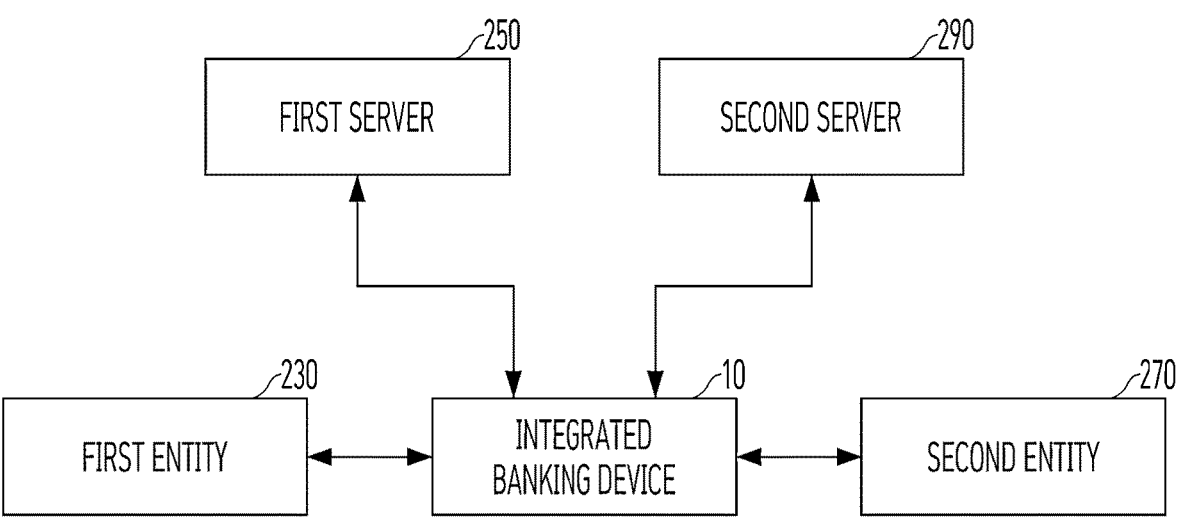
FIG. 2 is a diagram illustrating operations of the integrated banking device shown in FIG. 1.

FIG. 1 is a block diagram of an integrated banking device according to an exemplary embodiment, and FIG. 2 is a diagram illustrating operations of the integrated banking device shown in FIG. 1.

Referring to FIGS. 1 and 2, an integrated banking device 10 may provide an integrated banking service using fintech. The term "fintech" is a portmanteau combining the words "finance" and "technology," and may indicate financial services based on cutting-edge information technologies such as mobile, big data, social network service (SNS), and the like.

The integrated banking service may include an online service in which finance, such as payments, money transfers, asset management, and crowdfunding, and information technology (IT) are combined.

The integrated banking device 10 may manage transfers of money between a plurality of entities (e.g., a first entity 230 and a second entity 270). The plurality of entities (e.g., the first entity 230 and the second entity 270) may include a subject that may run a banking service. The plurality of entities (e.g., the first entity 230 and the second entity 270) may include a legal entity and a natural person. For example, the plurality of entities (e.g., the first entity 230 and the second entity 270) may include a business entity or an individual.

The integrated banking device 10 may interoperate with a plurality of servers (e.g., a first server 250 and a second server 290) to provide a banking service to the plurality of entities (e.g., the first entity 230 and the second entity 270).

The first server 250 may include a server of a service provider that provides a financial service. For example, the first server 250 may include a server of the Korea Financial Telecommunications & Clearings Institute or a server of a bank.

The second server 260 may include a server of an institution that issues transaction documents. For example, the second server 260 may include a server of a company that issues transaction statements, tax statements, and/or estimates.

The integrated banking device 10 may be implemented as a printed circuit board (PCB), such as a motherboard, an integrated circuit (IC), or a system on chip (CoC). The integrated banking device 10 may be implemented as an application processor.

Also, the integrated banking device 10 may be implemented in a personal computer (PC), a data server, a kiosk, or a portable device.

The portable device may be implemented as a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be implemented as a smart watch, a smart band, or a smart ring.

The integrated banking device 10 may include a receiver 100 and a processor 200. The integrated banking device 10 may further include a memory 300.

The receiver 100 may include a receiving interface. The receiver 100 may receive data externally or from the memory 300. The receiver 100 may output the received data to the processor 200.

The receiver 100 may receive account information of an entity which provides money (e.g., the second entity 270) from an entity which requests the deposit of money (e.g., the first entity 230).

The processor 200 may process data stored in the memory 300. The processor 200 may execute computer-readable code (e.g., software) stored in the memory 300 and instructions issued by the processor 200.

The processor 200 may be a data processing device implemented as hardware having a circuit with a physical structure for performing desired operations. For example, the desired operations may include code or instructions included in a program.

For example, the data processing device implemented as hardware may include a microprocessor, a CPU, a processor core, a multi-core processor, a multiprocessor, an ASIC, and an FPGA.

The processor 200 may receive the account information of the second entity 270 which provides money, from the first entity 230 which requests a deposit of the money, through the receiver 100. The processor 200 may interoperate with the first server 250 which provides a financial service on the basis of account information, and the second entity 270 to provide an application programming interface (API) for generating interoperation information corresponding to an account of the second entity 270.

The interoperation information may include an account number of the second entity 270, a balance of the account of the second entity 270, and a deposit and withdrawal history of the second entity 270.

The processor 200 may provide the API for generating interoperation information to the second entity 270. The processor 200 may store the interoperation information generated by performing scraping or crawling on the second entity 270 on the basis of the API in conjunction with the first server 250. The processor 200 may store the interoperation information in the memory 300.

Scraping may include an operation of automatically extracting data. Scraping may include an operation of extracting data with a specific pattern and storing the extracted data in a specific database.

Crawling may include an operation of searching for and collecting information. Crawling may involve generating a copy and a summary of data. Crawling may include an operation of indexing found or collected data.

The processor 200 may withdraw money from the account of the second entity 270 on the basis of the deposit request and the interoperation information.

The processor 200 may provide transfer information which is received from the first server 250 and corresponds to the withdrawal of money to the first entity 230. The processor 200 may interoperate with the second server 290 which issues a transaction document related to the money on the basis of the transfer information, to provide the transaction document to the first entity 230 and the second entity 270.

The transaction document may include at least one of an estimate, a tax statement, and a transaction statement related to the money.

The processor 200 may interoperate with the first server 250 to retrieve the account balance of the second entity 270. When the account balance satisfies the deposit request, the processor 200 may interoperate with the first server 250 to perform at least one of API provision and scraping or crawling and withdraw money from the account of the second entity 270. The processor 200 may deposit the money withdrawn from the account of the second entity 270 to a brokerage account and withdraw the money deposited in the brokerage account to an account of the first entity 230.

The processor 200 may interoperate with the first server 250 to retrieve the account balance of the second entity 270. When there is uncollected money due to the account balance not satisfying the deposit request, the processor 200 may search for at least one additional registered account of the second entity 270.

When there is at least one additional registered account of the second entity 270, the processor 200 may interoperate with the first server 250 to perform at least one of API provision and scraping or crawling and withdraw the uncollected money from the additional registered account of the second entity 270.

When there is not at least one additional registered account, the processor 200 may provide transfer stop information to the first entity 230.

When there is uncollected money because the money withdrawn from the at least one additional registered account does not satisfy the deposit request, the processor 200 may set a first balance retrieval interval for retrieving a balance of the at least one additional registered account.

When a balance corresponding to the uncollected money is not retrieved in the first balance retrieval interval, the processor 200 may set a second balance retrieval interval which is shorter than the first balance retrieval interval.

When the second balance retrieval interval is shorter than a threshold interval or exceeds a preset withdrawal deadline, the processor 200 may provide the first entity 230 with an option to perform compulsory execution on the second entity 270.

The option to perform compulsory execution may include an option for legal action. For example, options may include sending of a content certification, appointment of a lawyer, auction, seizure of rights, and/or provisional seizure of rights.

The processor 200 may interoperate with the first server 250 to retrieve the account balance of the second entity 270. When there is uncollected money due to the account balance not satisfying the deposit request, the processor 200 may search for bonds of the second entity 270.

The processor 200 may retrieve an account balance of a third entity which is an obligor of bonds of the second entity 270. The processor 200 may interoperate with the first server 250 on the basis of the deposit request to perform at least one of API provision and scraping or crawling and withdraw the uncollected money from an account of the third entity.

The processor 200 may deposit the uncollected money to the account of the first entity 230 through the account of the second entity 270 or deposit the uncollected money from the account of the third entity to a brokerage account. The processor 200 may withdraw the uncollected money deposited in the brokerage account to the account of the first entity 230.

The processor 200 may provide a banking service using artificial intelligence (AI).

The AI may be a computer system with functions of learning, inference, judgment, and the like. The AI may be implemented using a neural network.

The neural network (or artificial neural network) may include a statistical learning algorithm that mimics nerves in biology in terms of machine learning and cognitive science. The neural network may be any model in which artificial neurons (nodes) formed into a network by coupling their synapses change the strength of their synaptic couplings through learning to have a problem-solving ability.

The neurons of the neural network may have a combination of weights or biases. The neural network may include one or more layers with one or more neurons or nodes. The neural network may change the weights of the neurons through learning to infer a predictive result from any input.

The neural network may include a deep neural network. The neural network may include a convolutional neural network (CNN), a perceptron, a multilayer perceptron, a feed forward (FF) network, a radial basis function (RBF) network, a deep feed-forward (DFF) network, a long short-term memory (LSTM), a gated recurrent unit (GRU), an auto encoder (AE), a variational auto encoder (VAE), a denoising auto encoder (DAE), a sparse auto encoder (SAE), a Markov chain (MC), a hopfield network (HN), a Boltzmann machine (BM), a restricted Boltzmann machine (RBM), deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a transformer, and an attention network (AN).

The memory 300 may store data for computations performed in the processor 200 or computational results of the processor 200. The memory 300 may store instructions (or programs) executable by the processor 200. For example, the instructions may include instructions for performing operations of the processor 200 and/or operations of each element of the processor 200.

The memory 300 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, or an insulator resistance change memory.

The memory 300 may store navigation information and insurance information. The memory 300 may output the stored navigation information and insurance information to the processor 200 or externally in response to a request by the processor 200.

Figure 3:
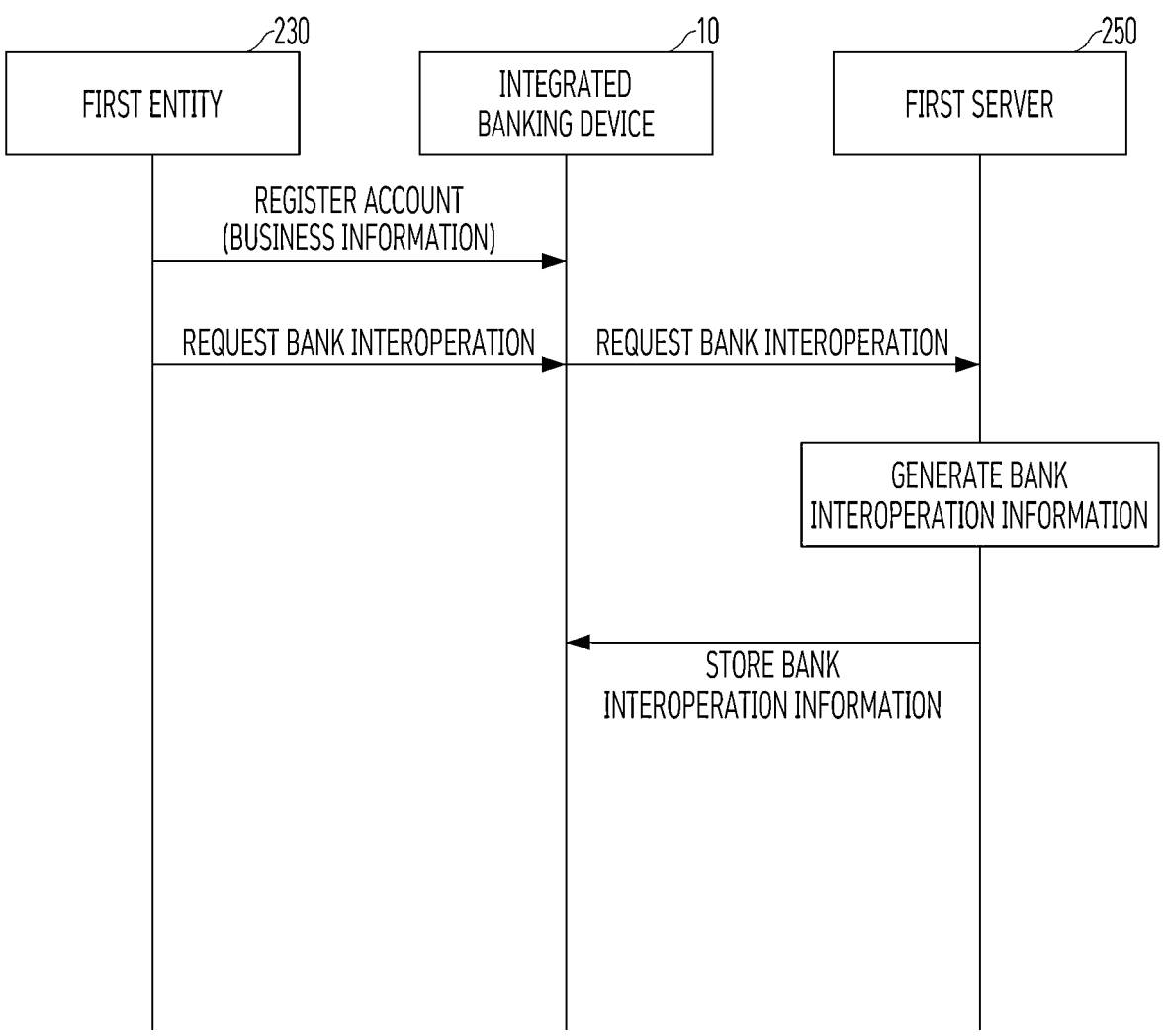
FIG. 3 is a sequence diagram illustrating an example of an operation in which the integrated banking device shown in FIG. 1 generates interoperation information.

FIG. 3 is a sequence diagram illustrating an example of an operation in which the integrated banking device shown in FIG. 1 generates interoperation information.

Referring to FIG. 3, a processor (e.g., the processor 200 of FIG. 1) may register an account of the first entity 230 that requests a deposit of money. The processor 200 may receive a bank interoperation request from the first entity 230 and interoperate with the first server 250 to generate and store interoperation information.

The interoperation information may include various financial information such as an account number, a bank, a balance, and a deposit and withdrawal history of a user of an integrated banking device (e.g., the integrated banking device 10 of FIG. 1). For example, the interoperation information may include a balance of the account of the first entity 230 and a deposit and withdrawal history of the account of the first entity 230.

The processor 200 may register the account of the first entity 230. The account registration may require business information and any information for using a financial service provided by the processor 200.

The processor 200 may perform the account registration by itself or by providing an API to the first entity 230.

The processor 200 may transmit the interoperation request to the first server 250 using the API and scraping or crawling. The processor 200 may store the interoperation information generated by the first server 250 in a memory (e.g., the memory 300 of FIG. 1).

Figure 4:
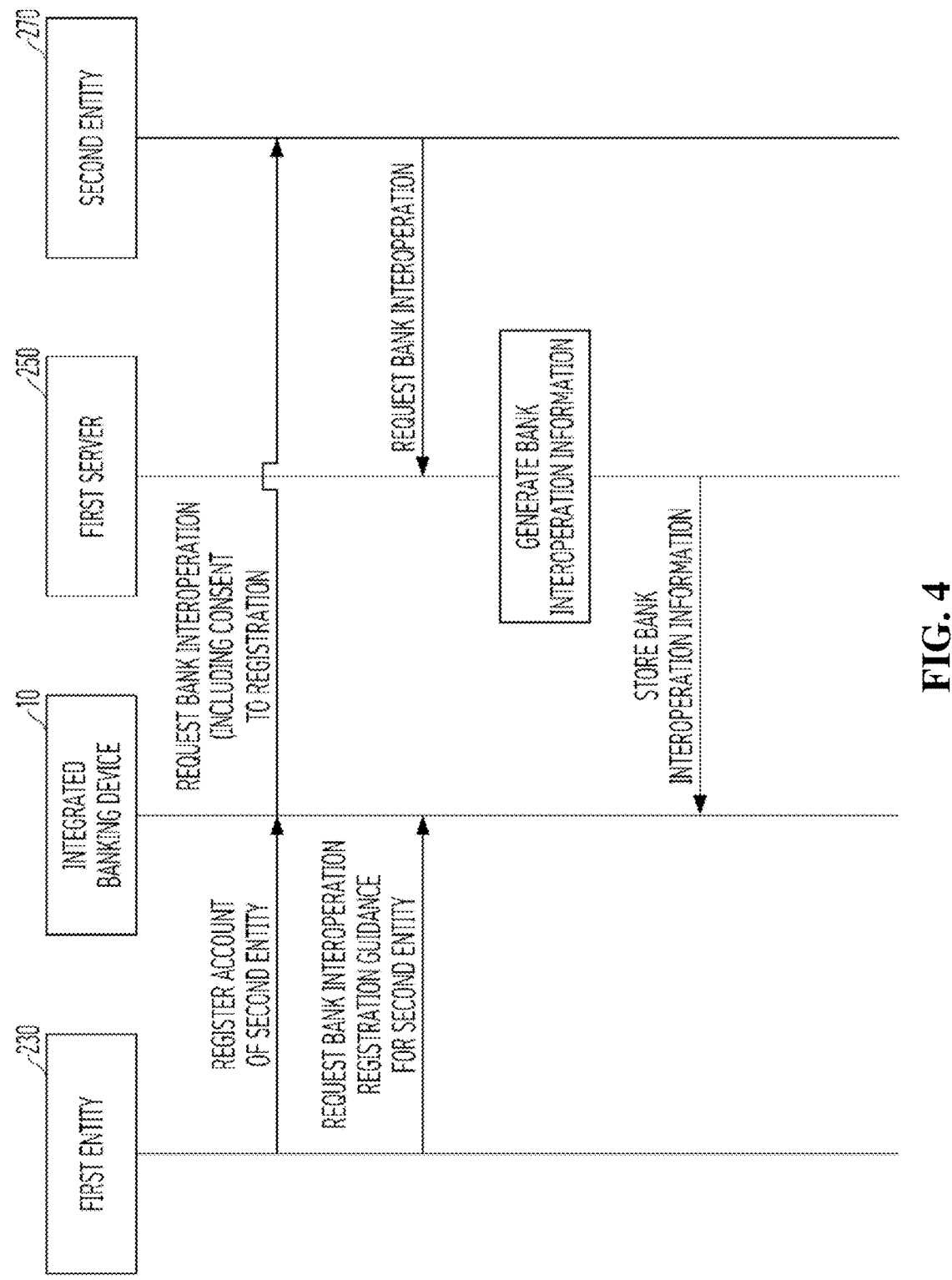
FIG. 4 is a sequence diagram illustrating another example of an operation in which the integrated banking device shown in FIG. 1 generates interoperation information.

FIG. 4 is a sequence diagram illustrating another example of an operation in which the integrated banking device shown in FIG. 1 generates interoperation information.

Referring to FIG. 4, a processor (e.g., the processor 200 of FIG. 1) may receive account information of a second entity (e.g., the second entity 270 of FIG. 2) which provides money, from the first entity 230 which requests a deposit of money.

The processor 200 may provide an API for generating interoperation information corresponding to an account of the second entity 270 in conjunction with the first server 250, which provides a financial service on the basis of account information, and the second entity 270.

The interoperation information may include various financial information such as an account number, a bank, a balance, and a deposit and withdrawal history of a user of an integrated banking device (e.g., the integrated banking device 10 of FIG. 1). For example, the interoperation information may include an account number of the second entity 270, a balance of the account of the second entity 270, and a deposit and withdrawal history of the account of the second entity 270.

The processor 200 may transmit a consent request for the generation of interoperation information and a transfer of money to the second entity 270. In response to receiving the consent from the second entity 270, the processor 200 may register the account of the second entity 270 and generate and store interoperation information.

The processor 200 may perform account registration for the first entity 230 or the second entity 270. The account registration may require business information and any information for using a financial service provided by the processor 200.

The processor 200 may perform the account registration by itself or by providing an API to the first entity 230 or the second entity 270.

The processor 200 may receive an interoperation registration guidance request for the second entity 270 from the first entity 230. In response to the interoperation registration guidance request, the processor 200 may interoperate with the first server 250 to transmit an interoperation request (e.g., a bank interoperation request) to the second entity 270.

The processor 200 may interoperate with the first server 250 to generate the interoperation information to the first server 250 using the API and scraping or crawling on the second entity 270 and store the generated interoperation information in a memory (e.g., the memory 300 of FIG. 1).

Figure 5:
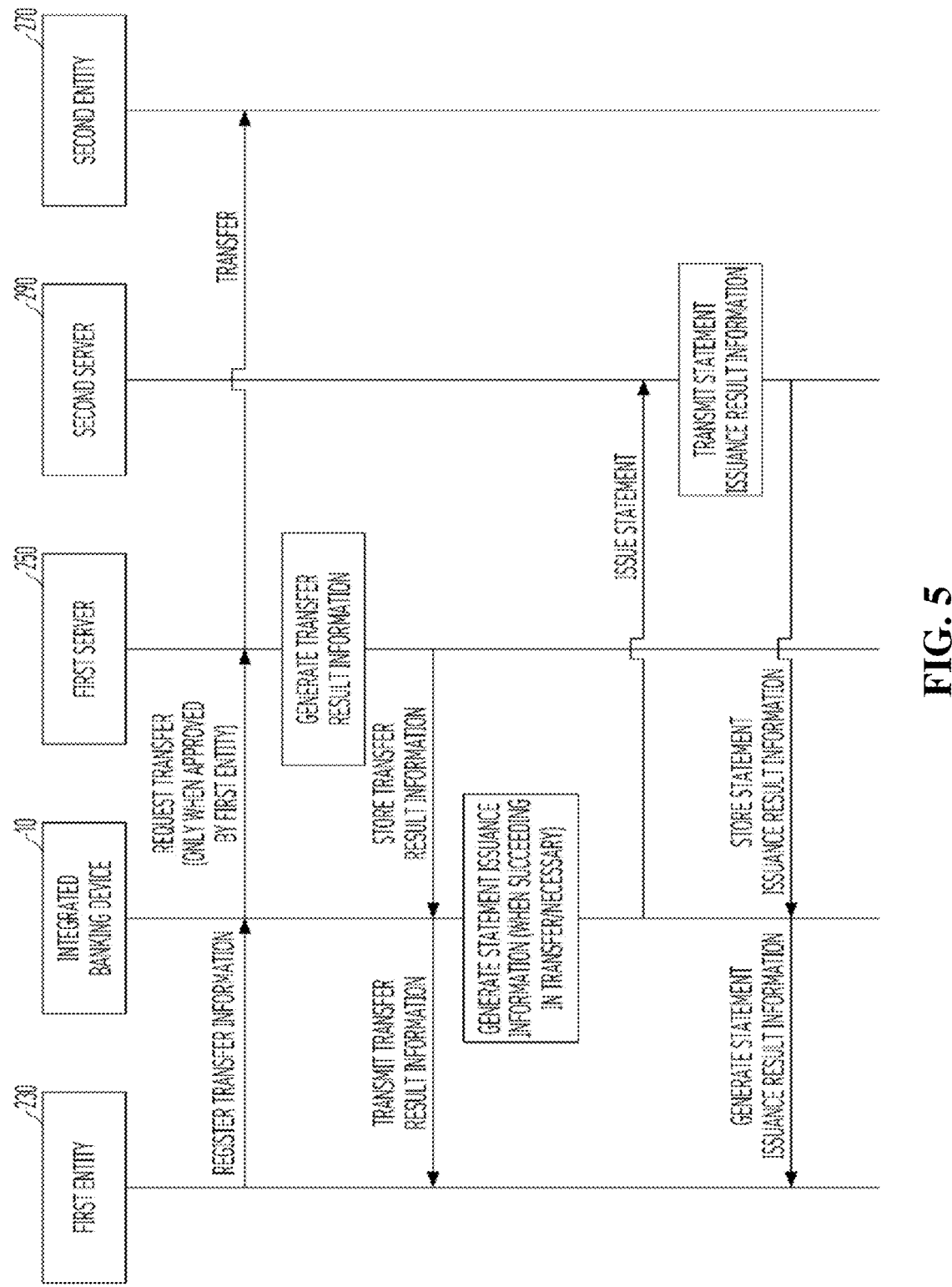
FIG. 5 is a sequence diagram illustrating an example of an operation in which the integrated banking device shown in FIG. 1 performs a money transfer and issues a statement.

FIG. 5 is a sequence diagram illustrating an example of an operation in which the integrated banking device shown in FIG. 1 performs a money transfer and issues a statement.

Referring to FIG. 5, a processor (e.g., the processor 200 of FIG. 1) may provide transfer information which is received from the first server 250 and corresponds to a withdrawal of money to the first entity 230. The processor 200 may interoperate with the second server 290 which issues a transaction document related to the money on the basis of the transfer information, to provide the transaction document to the first entity 230 and the second entity 270. The transaction document may include at least one of an estimate, a tax statement, and a transaction statement related to the money.

The processor 200 may register accounts of the first entity 230 and the second entity 270. An account registration process is the same as described above with reference to FIGS. 3 and 4.

The processor 200 may interoperate with the first server 250 to withdraw money from the account of the second entity 270. The processor 200 may request consent to bank interoperation from the second entity 270 and receive a response about whether the second entity 270 consents.

The processor 200 may interoperate with the first server 250 to generate and store interoperation information related to the second entity 270.

When a money transfer request is received from the first entity 230, the processor 200 may withdraw money from the account of the second entity 270 on the basis of the stored interoperation information. When money is withdrawn, the processor 200 may interoperate with the first server 250 to generate transfer result information (e.g., bank transfer result information). The transfer result information may include a depositor's name, a recipient's name, an account number, the amount of transferred money, and a transfer time and date.

The processor 200 may store the transfer result information in a memory (e.g., the memory 300 of FIG. 1). The processor 200 may transmit the transfer result information to the first entity 230.

The processor 200 may generate or issue a transaction document. The processor 200 may issue the transaction document in response to a request by the first entity 230 or the second entity 270 or when succeeding in the transfer.

The processor 200 may store information about the type of transaction document, the sort of transaction document, whether the transaction is entitled to tax exemption, and/or the transfer result information and issue the transaction document on the basis of the stored information. The type of transaction document may include an estimate, a tax statement, and/or a transaction statement. The sort of transaction document may include billing or receipt.

The processor 200 may change a transaction document issuance criterion on the basis of account information or the interoperation information registered by the first entity 230 or the second entity 270.

The processor 200 may provide the transfer result information and transaction document issuance information to the first entity 230 or the second entity 270 in the form of a text notification, mail, popup, and/or API. The processor 200 may store the transaction document issuance information in the memory 300.

Figure 6:
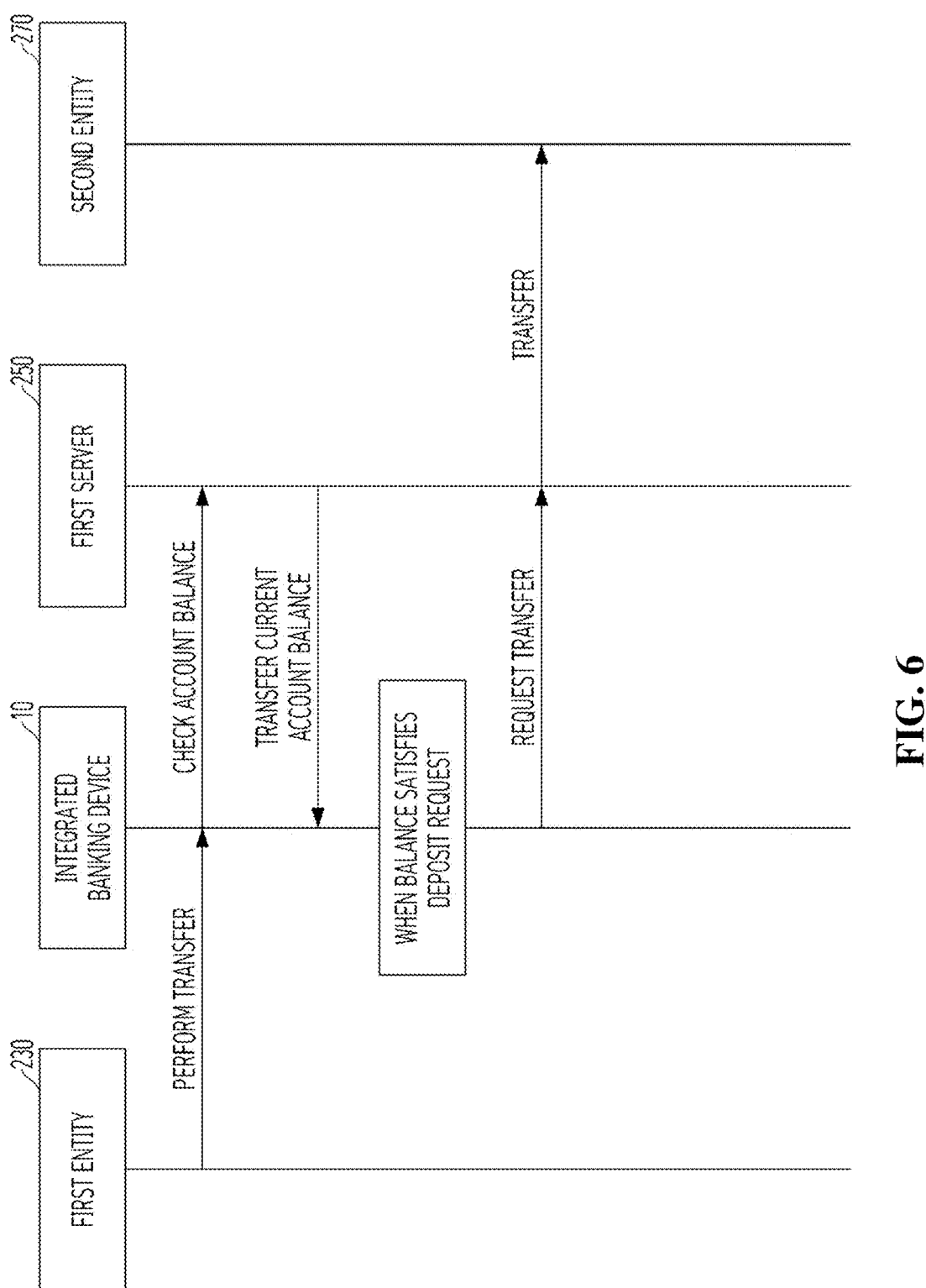
FIGS. 6 and 7 are sequence diagrams illustrating examples of operations of the integrated banking device shown in FIG. 1 in accordance with an account balance.
Figure 7:
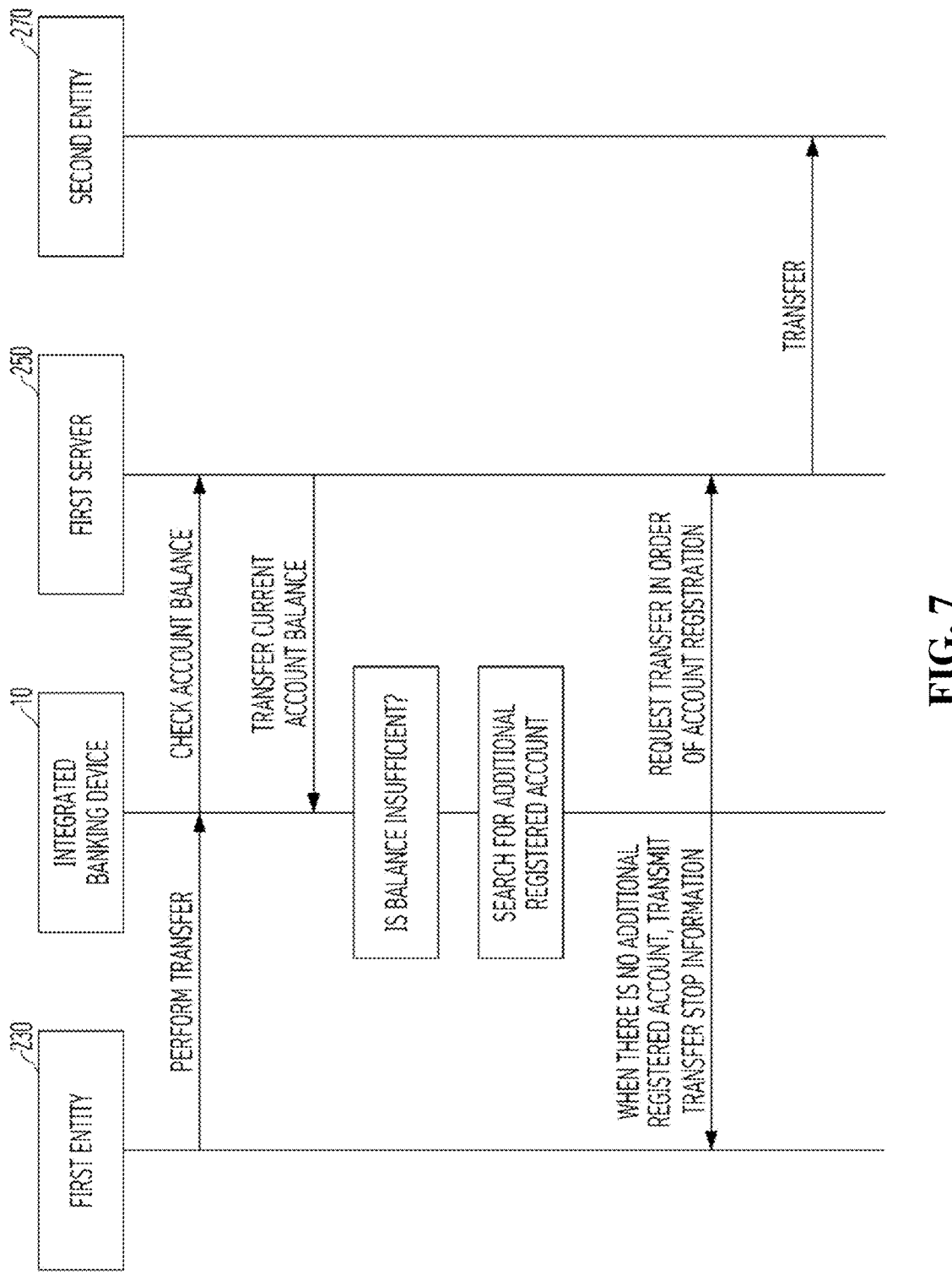

FIGS. 6 and 7 are sequence diagrams illustrating examples of operations of the integrated banking device shown in FIG. 1 in accordance with an account balance.

Referring to FIGS. 6 and 7, a processor (e.g., the processor 200 of FIG. 1) may interoperate with the first server 250 to retrieve an account balance of the second entity 270. The processor 200 may interoperate with the first server 250 to retrieve a balance of an account of the second entity 270 in response to a deposit request by the first entity 230.

The processor 200 may determine whether the account balance of the second entity 270 satisfies the deposit request. When the account balance satisfies the deposit request, the processor 200 may interoperate with the first server 250 to perform at least one of API provision and scrapping or crawling and withdraw money from the account of the second entity 270.

The processor 200 may deposit the money withdrawn from the account of the second entity 270 to a brokerage account and withdraw the money deposited in the brokerage account to an account of the first entity 230.

The processor 200 may interoperate with the first server 250 to retrieve the account balance of the second entity 270. When there is uncollected money due to the account balance not satisfying the deposit request, the processor 200 may search for at least one additional registered account of the second entity 270.

When there is at least one additional registered account of the second entity 270, the processor 200 may interoperate with the first server 250 to perform at least one of API provision and scraping or crawling and withdraw the uncollected money from the additional registered account of the second entity 270.

When there is not at least one additional registered account, the processor 200 may provide transfer stop information to the first entity 230.

When there is uncollected money because the money withdrawn from the at least one additional registered account does not satisfy the deposit request, the processor 200 may set a first balance retrieval interval for retrieving a balance of the at least one additional registered account.

When a balance corresponding to the uncollected money is not retrieved in the first balance retrieval interval, the processor 200 may set a second balance retrieval interval which is shorter than the first balance retrieval interval.

The processor 200 may determine the priority order of a plurality of additional registered accounts on the basis of the amount of money corresponding to the deposit request. The processor 200 may determine the priority order of the plurality of additional registered accounts in accordance with a selection of the first entity 230 or the second entity 270.

The processor 200 may perform withdrawals sequentially on the basis of the determined priority order. When the sum of all money of the plurality of additional registered accounts is less than the amount of money to be transferred in accordance with the deposit request, the processor 200 may stop the transfer.

When the second balance retrieval interval is shorter than a threshold interval or exceeds a preset withdrawal deadline, the processor 200 may provide the first entity 230 with an option to perform compulsory execution on the second entity 270.

The option to perform compulsory execution may include an option for legal action. For example, options may include sending of a content certification, appointment of a lawyer, auction, seizure of rights, and/or provisional seizure of rights.

The processor 200 may determine a monetary situation of the second entity 270 using a neural network. The processor 200 may learn a deposit or withdrawal pattern of the second entity 270 by inputting changes in the account of the second entity 270 to the neural network.

The deposit or withdrawal pattern may include the amounts, timings, intervals, and/or sources of deposits or withdrawals.

The processor 200 may predict a timing for withdrawing money from the account of the second entity 270 on the basis of the learned deposit or withdrawal pattern and determine the priority order of the plurality of additional registered accounts.

The processor 200 may determine weights corresponding to the plurality of additional registered accounts using the neural network and determine the priority order of the plurality of additional registered accounts and/or withdrawal timings for the plurality of additional registered accounts on the basis of the determined weights.

Figure 8:
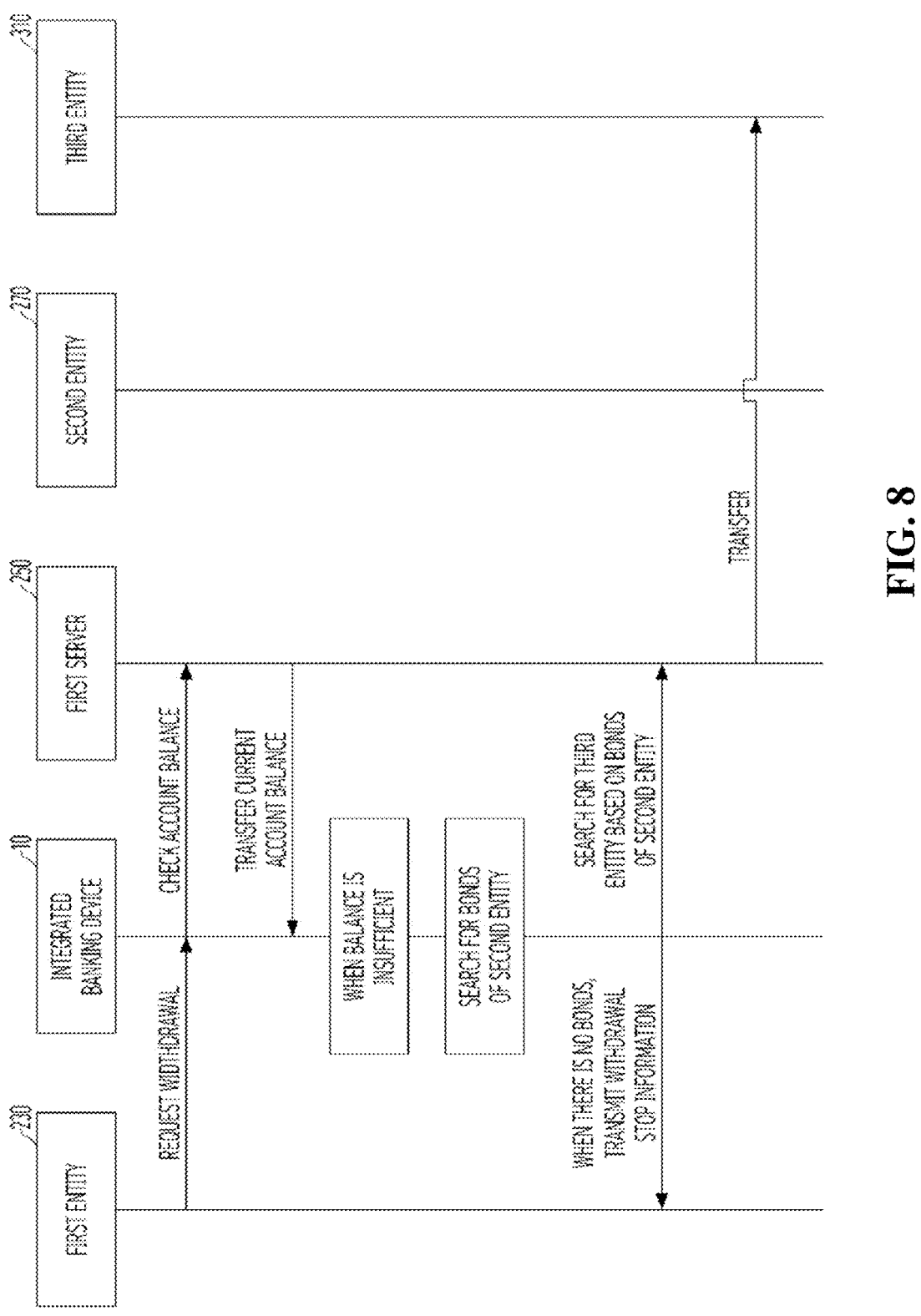
FIG. 8 is a sequence diagram illustrating an example of a bond search operation of the integrated banking device shown in FIG. 1.

FIG. 8 is a sequence diagram illustrating an example of a bond search operation of the integrated banking device shown in FIG. 1.

Referring to FIG. 8, a processor (e.g., the processor 200 of FIG. 1) may interoperate with the first server 250 to retrieve an account balance of the second entity 270. When there is uncollected money due to the account balance not satisfying a deposit request, the processor 200 may search for bonds of the second entity 270.

The processor 200 may retrieve an account balance of a third entity 310 which is an obligor of bonds of the second entity 270. The processor 200 may interoperate with the first server 250 on the basis of the deposit request to perform at least one of API provision and scraping or crawling and withdraw the uncollected money from the account of the third entity 310.

The processor 200 may deposit the uncollected money to the account of the first entity 230 through the account of the second entity 270. The processor 200 may deposit the uncollected money from the account of the third entity 310 to a brokerage account. The processor 200 may withdraw the uncollected money deposited in the brokerage account to the account of the first entity 230.

The processor 200 may determine whether the second entity 270 or the third entity 310 subscribes to a service provided by the integrated banking device 10. When the second entity 270 or the third entity 310 does not subscribe to the service provided by the integrated banking device 10, the processor 200 may provide an API for account registration.

The processor 200 may classify the bonds of the second entity 270 using a neural network. By inputting the account information of the second entity 270 to the neural network, the processor 200 may determine types of bonds held by the second entity 270, the amount of the bonds, and whether the bonds are exercisable.

An operation in which the processor 200 retrieves a balance of the third entity 310 and withdraw money from an addition registered account may be the same as described above with reference to FIG. 7.

Figure 9:
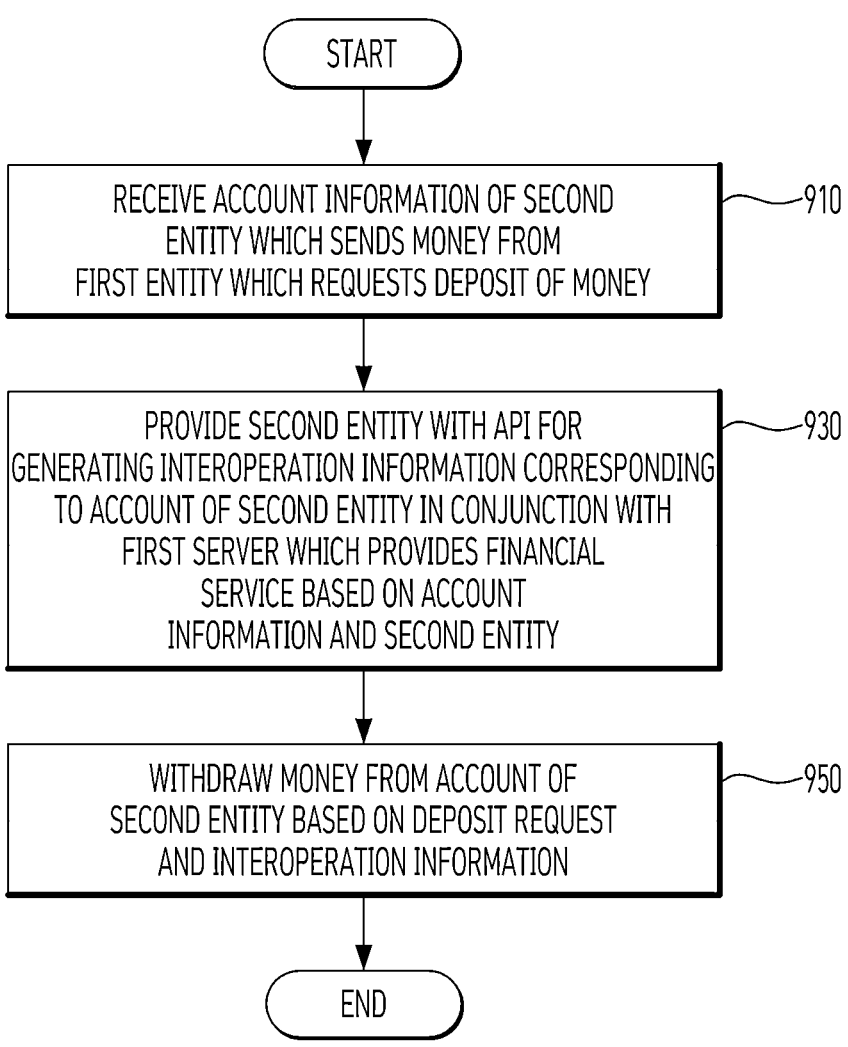
FIG. 9 is a flowchart of operations of the integrated banking device shown in FIG. 1.

FIG. 9 is a flowchart of operations of the integrated banking device shown in FIG. 1.

Referring to FIG. 9, a receiver (e.g., the receiver 100 of FIG. 1) may receive account information of the second entity 270 which provides money, from the first entity 230 which requests a deposit of money (910).

The processor 200 may interoperate with the first server 250 which provides a financial service on the basis of the account information, and the second entity 270 to provide the second entity 270 with an API for generating interoperation information corresponding to an account of the second entity 270 (930).

The interoperation information may include an account number of the second entity 270, a balance of the account of the second entity 270, and a deposit and withdrawal history of the second entity 270.

The processor 200 may provide the API for generating interoperation information to the second entity 270. The processor 200 may store the interoperation information generated by performing scraping or crawling on the second entity 270 on the basis of the API in conjunction with the first server 250. The processor 200 may store the interoperation information in the memory 300.

The processor 200 may withdraw money from the account of the second entity 270 on the basis of the deposit request and the interoperation information (950).

The processor 200 may provide transfer information which is received from the first server 250 and corresponds to the withdrawal of money to the first entity 230. The processor 200 may interoperate with the second server 290 which issues a transaction document related to the money on the basis of the transfer information, to provide the transaction document to the first entity 230 and the second entity 270.

The transaction document may include at least one of an estimate, a tax statement, and a transaction statement related to the money.

The processor 200 may interoperate with the first server 250 to retrieve the account balance of the second entity 270. When the account balance satisfies the deposit request, the processor 200 may interoperate with the first server 250 to perform at least one of API provision and scraping or crawling and withdraw money from the account of the second entity 270. The processor 200 may deposit the money withdrawn from the account of the second entity 270 to a brokerage account and withdraw the money deposited in the brokerage account to an account of the first entity 230.

The processor 200 may interoperate with the first server 250 to retrieve the account balance of the second entity 270. When there is uncollected money due to the account balance not satisfying the deposit request, the processor 200 may search for at least one additional registered account of the second entity 270.

When there is at least one additional registered account of the second entity 270, the processor 200 may interoperate with the first server 250 to perform at least one of API provision and scraping or crawling and withdraw the uncollected money from the additional registered account of the second entity 270.

When there is not at least one additional registered account, the processor 200 may provide transfer stop information to the first entity 230.

When there is uncollected money because the money withdrawn from the at least one additional registered account does not satisfy the deposit request, the processor 200 may set a first balance retrieval interval for retrieving a balance of the at least one additional registered account.

When a balance corresponding to the uncollected money is not retrieved in the first balance retrieval interval, the processor 200 may set a second balance retrieval interval which is shorter than the first balance retrieval interval.

When the second balance retrieval interval is shorter than a threshold interval or exceeds a preset withdrawal deadline, the processor 200 may provide the first entity 230 with an option to perform compulsory execution on the second entity 270.

The option to perform compulsory execution may include an option for legal action. For example, options may include sending of a content certification, appointment of a lawyer, auction, seizure of rights, and/or provisional seizure of rights.

The processor 200 may interoperate with the first server 250 to retrieve the account balance of the second entity 270. When there is uncollected money due to the account balance not satisfying the deposit request, the processor 200 may search for bonds of the second entity 270.

The processor 200 may retrieve an account balance of a third entity which is an obligor of bonds of the second entity 270. The processor 200 may interoperate with the first server 250 on the basis of the deposit request to perform at least one of API provision and scraping or crawling and withdraw the uncollected money from an account of the third entity.

The processor 200 may deposit the uncollected money to the account of the first entity 230 through the account of the second entity 270 or deposit the uncollected money from the account of the third entity to a brokerage account. The processor 200 may withdraw the uncollected money deposited in the brokerage account to the account of the first entity 230.

The above-described embodiments may be implemented by hardware components, software components, and/or combinations thereof. For example, the device, method, and components described in the embodiments may be implemented using a general-use computer or a special-purpose computer such as a processor, a controller, an arithmetic logic unit (ALU), a digital signal processor, a microcomputer, an FPGA, a programmable logic unit (PLU), a microprocessor, or any other device which may execute instructions and respond. A processing device may execute an operating system (OS) or software applications running the OS. Also, the processing device may access, store, manipulate, process, and generate data in response to execution of software. Although one processing device is described as being used in some cases for convenience of understanding, it will be understood by those of ordinary skill in the art that the processing device may include a plurality of processing elements and/or a plurality of types of processing elements. For example, the processing device may include a plurality of processors or one processor and one controller. Also, the processing device may have a different processing configuration such as a parallel processor.

Software may include computer programs, codes, instructions or a combination of one or more thereof and may configure a processing device to operate in a desired manner or may independently or collectively control the processing device. Software and/or data may be permanently or temporarily embodied in any type of machine, component, physical equipment, virtual equipment, computer storage medium or device, or transmitted signal waves to be interpreted by the processing device or to provide instructions or data to the processing device. Software may be distributed throughout computer systems connected via a network and may be stored or executed in a distributed manner. Software and data may be recorded on a computer-readable recording medium.

Methods according to embodiments may be implemented in the form of program instructions which are executable by various computing devices, and may be recorded on a computer-readable recording medium. The computer-readable recording medium may store program instructions, data files, data structures, and the like alone or in combination, and program instructions recorded on the medium may be designed and configured especially for embodiments or known and available to those skilled in computer software. Examples of the computer-readable recording medium include magnetic media, such as a hard disk, a floppy disk, and magnetic tape, optical media, such as a compact disc read-only memory (CD-ROM) and a digital versatile disc (DVD), magneto-optical media, such as a floptical disk, and hardware devices that are specially configured to store and perform program instructions. Examples of the program instructions include both machine code produced by a compiler and high-level code that may be executed by a computer using an interpreter or the like.

The foregoing hardware devices may be configured to operate as one or more software modules to perform operations of embodiments, and vice versa.

Exemplary embodiments can increase user convenience by automating the management of money and issuance of documents between entities that frequently transfer money.

In addition to this, various effects that are identified directly or indirectly in the present document can be provided.

Although embodiments have been described above with the limited drawings, those of ordinary skill in the art may apply various technical modifications and variations to the embodiments. For example, appropriate results can be achieved even when the described techniques are executed in a different order from the described method and/or components of the described system, structure, device, circuit, and the like are coupled or combined in a different form from the described method or replaced or substituted by other components or equivalents.

Therefore, other implementations, other embodiments, and equivalents of the claims fall within the scope of the following claims.

What is claimed is:

1. An integrated banking device using fintech, comprising:
   a receiver configured to receive account information of a second entity which provides money from a first entity which requests a deposit of money; and
   a processor configured to provide the second entity with an application programming interface (API) for generating interoperation information corresponding to an account of the second entity in conjunction with a first server, which provides a financial service on the basis of the account information, and the second entity and withdraw money from the account of the second entity on the basis of the deposit request and the interoperation information,
   wherein the processor interoperates with the first server to retrieve an account balance of the second entity,
   when there is uncollected money due to the account balance not satisfying the deposit request, determines types of bonds held by the second entity, an amount of the bonds, and whether the bonds are exercisable using a neural network, retrieves an account balance of a third entity which is an obligor of the bonds of the second entity, interoperates with the first server on the basis of the deposit request to perform at least one of API provision and scraping or crawling and withdraw the uncollected money from an account of the third entity, and deposits the uncollected money to an account of the first entity through the account of the second entity, or deposits the uncollected money from the account of the third entity to a brokerage account and withdraws the uncollected money deposited in the brokerage account to the account of the first entity.

2. The integrated banking device of claim 1, wherein the interoperation information includes an account number of the second entity, the balance of the account of the second entity, and a deposit and withdrawal history of the account of the second entity, and the processor provides the API for generating interoperation information to the second entity and stores the interoperation information generated by performing scraping or crawling on the second entity in conjunction with the first server on the basis of the API.

3. The integrated banking device of claim 1, wherein the processor provides the first entity with transfer information which is received from the first server and corresponds to the withdrawal of the money, and interoperates with a second server, which issues a transaction document related to the money on the basis of the transfer information, to provide the transaction document to the first entity and the second entity, and the transaction document includes at least one of an estimate, a tax statement, and a transaction statement related to the money.

4. The integrated banking device of claim 1, wherein the processor interoperates with the first server to retrieve the account balance of the second entity, and when the account balance satisfies the deposit request, interoperates with the first server to perform at least one of API provision and scraping or crawling and withdraw money from the account of the second entity, deposits the money withdrawn from the account of the second entity to a brokerage account and withdraws the money deposited in the brokerage account to the account of the first entity.

5. The integrated banking device of claim 1, wherein the processor interoperates with the first server to retrieve the account balance of the second entity, when there is uncollected money due to the account balance not satisfying the deposit request, searches for at least one additional registered account of the second entity, when there is at least one additional registered account, interoperates with the first server to perform at least one of API provision and scraping or crawling and withdraw the uncollected money from the additional registered account of the second entity, and when there is not the at least one additional registered account, providing transfer stop information to the first entity.

6. The integrated banking device of claim 5, wherein, when there is uncollected money because the money withdrawn from the at least one additional registered account does not satisfy the deposit request, the processor sets a first balance retrieval interval for retrieving a balance of the at least one additional registered account, when a balance corresponding to the uncollected money is not retrieved in the first balance retrieval interval, sets a second balance retrieval interval which is shorter than the first balance retrieval interval, and when the second balance retrieval interval is shorter than a threshold interval or exceeds a preset withdrawal deadline, provides the first entity with an option to perform compulsory execution on the second entity.

* * * * *